US012687037B2

(12) United States Patent
Sandoval, Jr. et al.

(10) Patent No.: US 12,687,037 B2
(45) Date of Patent: Jul. 21, 2026

(54) STATUS INDICATING LOCKSET TRIM

(71) Applicant: Schlage Lock Company LLC, Carmel, IN (US)

(72) Inventors: Jaime Sandoval, Jr., Colorado Springs, CO (US); Ashwin Bajikar, Belagavi (IN); Nathanael Taylor, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 90 days.

(21) Appl. No.: 18/522,607

(22) Filed: Nov. 29, 2023

(65) Prior Publication Data

US 2025/0172014 A1 May 29, 2025

(51) Int. Cl.
*E05B 41/00* (2006.01)
*E05B 15/02* (2006.01)

(52) U.S. Cl.
CPC .............. *E05B 41/00* (2013.01); *E05B 15/02* (2013.01)

(58) Field of Classification Search
CPC .. E05B 41/00; Y10T 292/0977; Y10T 292/82; Y10T 292/85
See application file for complete search history.

(56) References Cited

U.S. PATENT DOCUMENTS

| | | | | | |
|---|---|---|---|---|---|
| 438,505 | A * | 10/1890 | Tate | E05B 41/00 | 40/907 |
| 689,429 | A * | 12/1901 | Smith | E05B 41/00 | 40/907 |
| 1,337,401 | A * | 4/1920 | Heberling | E05B 41/00 | 40/907 |
| 2,455,208 | A * | 11/1948 | Wirth | E05B 41/00 | 40/907 |
| 2,784,993 | A * | 3/1957 | Collar | E05B 57/00 | 292/DIG. 31 |
| 3,549,184 | A * | 12/1970 | Anderson | E05B 13/005 | 292/195 |

(Continued)

FOREIGN PATENT DOCUMENTS

| | | | |
|---|---|---|---|
| FR | 500300 | A * | 3/1920 |
| GB | 338302 | A * | 11/1930 |

OTHER PUBLICATIONS

International Search Report; ISA/US; International Application No. PCT/US2024/057390; Mar. 24, 2025; 2 pages.

(Continued)

*Primary Examiner* — Carlos Lugo
(74) *Attorney, Agent, or Firm* — Taft Stettinius & Hollister LLP

(57) ABSTRACT

An exemplary lockset trim generally includes an escutcheon, an indicator mechanism, and a cam. The indicator mechanism is mounted in the escutcheon for sliding movement between a first linear position, in which a first indicium is visible via a window in the escutcheon, and a second linear position, in which a second indicium is visible via the window. The indicator mechanism is biased toward the first linear position. The cam is rotatably mounted in the escutcheon for rotation about a longitudinal axis between a first rotational position, in which the cam permits the indicator mechanism to adopt the first linear position, and a second rotational position, in which the cam retains the indicator mechanism in the second linear position.

11 Claims, 7 Drawing Sheets

(56) References Cited

U.S. PATENT DOCUMENTS

| | | | | |
|---|---|---|---|---|
| 4,012,929 | A * | 3/1977 | Solovieff | E05B 63/0017 70/381 |
| 5,067,758 | A * | 11/1991 | Fann | E05B 3/065 292/347 |
| 6,491,327 | B1 * | 12/2002 | Fan | E05B 15/02 292/336.3 |
| 6,938,445 | B2 * | 9/2005 | Huang | E05B 41/00 70/432 |
| 7,257,973 | B2 * | 8/2007 | Romero | E05B 9/02 292/336.3 |
| 9,169,669 | B2 * | 10/2015 | Clary | E05B 41/00 |
| 9,845,620 | B2 | 12/2017 | Bronner | |
| 11,486,163 | B2 | 11/2022 | Sweeney et al. | |
| 11,725,416 | B2 * | 8/2023 | Lin | E05B 1/0053 292/336.3 |
| 12,129,684 | B2 * | 10/2024 | Zheng | E05B 39/00 |
| 12,234,668 | B2 * | 2/2025 | Hoiland | E05B 9/00 |
| 2015/0225982 | A1 | 8/2015 | Bronner | |
| 2015/0240526 | A1 | 8/2015 | Clary et al. | |
| 2020/0408002 | A1 | 12/2020 | Woodley et al. | |
| 2023/0041148 | A1 | 2/2023 | Sweeney et al. | |

OTHER PUBLICATIONS

Written Opinion of the International Searching Authority; ISA/US; International Application No. PCT/US2024/057390; Mar. 24, 2025; 11 pages.

* cited by examiner

STATUS INDICATING LOCKSET TRIM

TECHNICAL FIELD

The present disclosure generally relates to status indicating locksets, and more particularly but not exclusively relates to trims for deadbolt locksets.

BACKGROUND

Indicator mechanisms are occasionally provided to locksets to provide a visual indication regarding the locked/unlocked state of the lockset. For example, certain deadbolt locksets are provided with a rotatable indicator that is rotationally coupled with the tailpiece of a lock cylinder such that there is a direct correspondence between the rotational position of the tailpiece and the rotational position of the indicator. However, this arrangement may be susceptible to tampering attacks. For example, if an attacker is able to tamper with the sign, the attacker may be able to force the sign to rotate the tailpiece, thereby unlocking the lockset. For these reasons among others, there remains a need for further improvements in this technological field.

SUMMARY

An exemplary lockset trim generally includes an escutcheon, an indicator mechanism, and a cam. The indicator mechanism is mounted in the escutcheon for sliding movement between a first linear position, in which a first indicium is visible via a window in the escutcheon, and a second linear position, in which a second indicium is visible via the window. The indicator mechanism is biased toward the first linear position. The cam is rotatably mounted in the escutcheon for rotation about a longitudinal axis between a first rotational position, in which the cam permits the indicator mechanism to adopt the first linear position, and a second rotational position, in which the cam retains the indicator mechanism in the second linear position. Further embodiments, forms, features, and aspects of the present application shall become apparent from the description and figures provided herewith.

DETAILED DESCRIPTION OF ILLUSTRATIVE EMBODIMENTS

Figure 1:
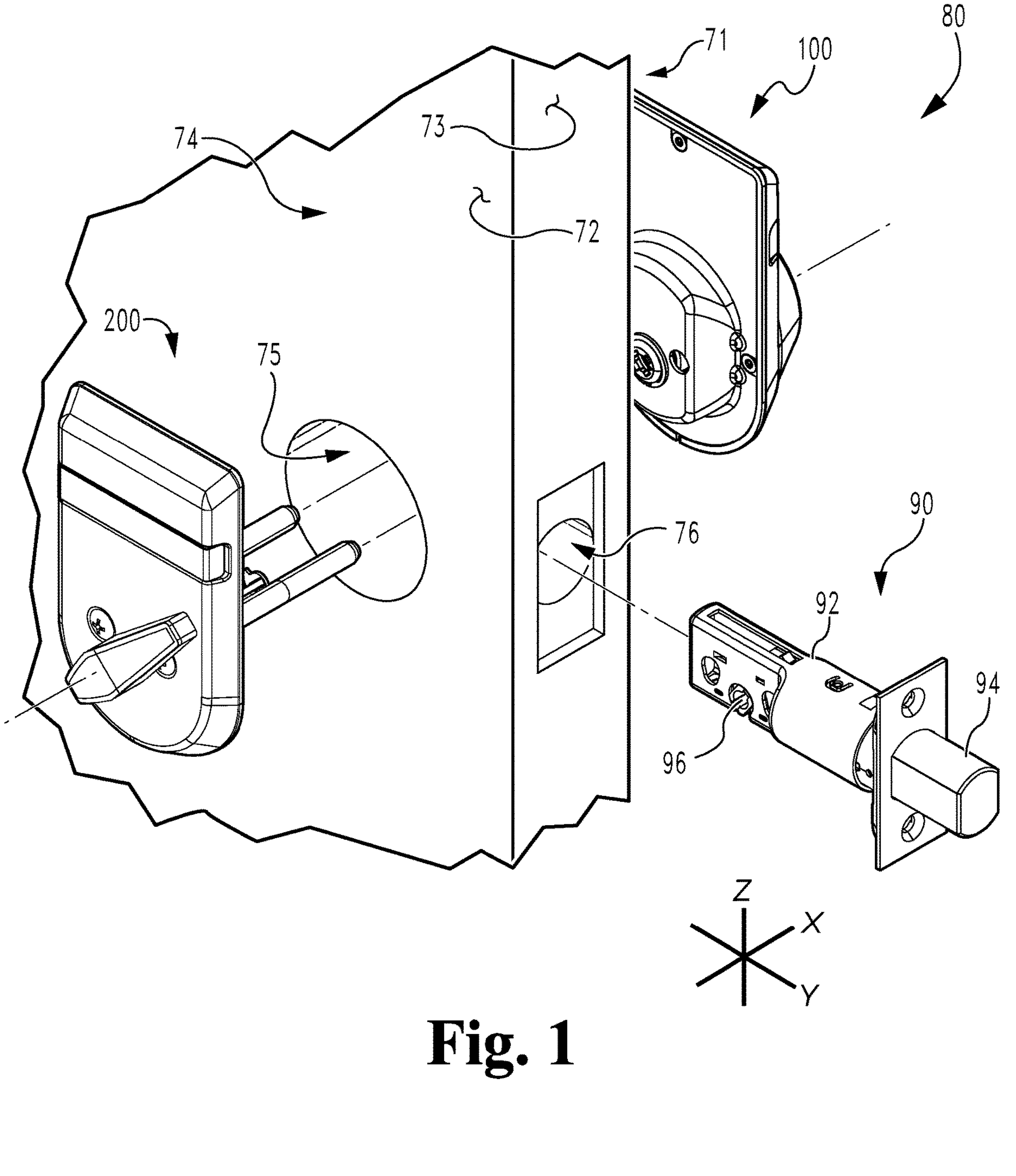
FIG. 1 is an exploded assembly view of a lockset according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a door 70 having a lockset 80 according to certain embodiments installed thereto. The door 70 has a non-egress side 71, an egress side 72 opposite the non-egress side 71, and a latch edge 73. The door 70 is provided with a standard door preparation 74, which includes a cross-bore 75 that extends between the non-egress side 71 and the egress side 72, and a latch bore 76 that extends from the latch edge 73 to the cross-bore 75. The lockset 80 generally includes a bolt mechanism 90 mounted in the latch bore 76, an outside trim 100 mounted to the non-egress side 91, and an inside trim 200 mounted to the egress side 92. As described herein, each of the trims 100, 200 is operable to actuate the bolt mechanism 90 to lock and unlock the lockset 80.

The lockset 80 has a first state and a second state, and includes at least one indicator operable to provide a visual indication regarding the current state of the lockset 80. In the illustrated form, one of the first state or the second state is a locked state, and the other of the first state and the second state is an unlocked state. It is also contemplated that the concepts described herein may be utilized to provide a visual indication regarding another set of states of the lockset 80.

The illustrated bolt mechanism 90 is provided in the form of a deadbolt mechanism, and generally includes a housing 92, a deadbolt 94 slidably mounted in the housing 92, and a retractor 96 rotatably mounted in the housing 92. The retractor 96 is engaged with the deadbolt 94 such that rotation of the retractor 96 drives the deadbolt 94 between its extended position and its retracted position. The retractor 96 has a first rotational position corresponding to a first linear position of the deadbolt 94 (e.g., one of the extended position or the retracted position), and a second rotational position corresponding to a second linear position of the deadbolt 94 (e.g., the other of the extended position or the retracted position).

In the illustrated embodiment, the lockset 80 is provided as a deadbolt lockset, in which the locked/unlocked state of the lockset 80 is defined by the extended/retracted position of the deadbolt 94. As such, the first state of the lockset 80 corresponds to the first position of the deadbolt 94, and the second state of the lockset 80 corresponds to the second position of the deadbolt 94. It is also contemplated that indicator mechanisms such as those described herein may be utilized to indicate states other than the locked/unlocked state, and that the locked/unlocked state may not necessarily correspond to the extended/retracted position of a deadbolt. For example, the locked/unlocked state may instead relate to the ability of an actuator to retract a spring-biased latchbolt.

Figure 2:
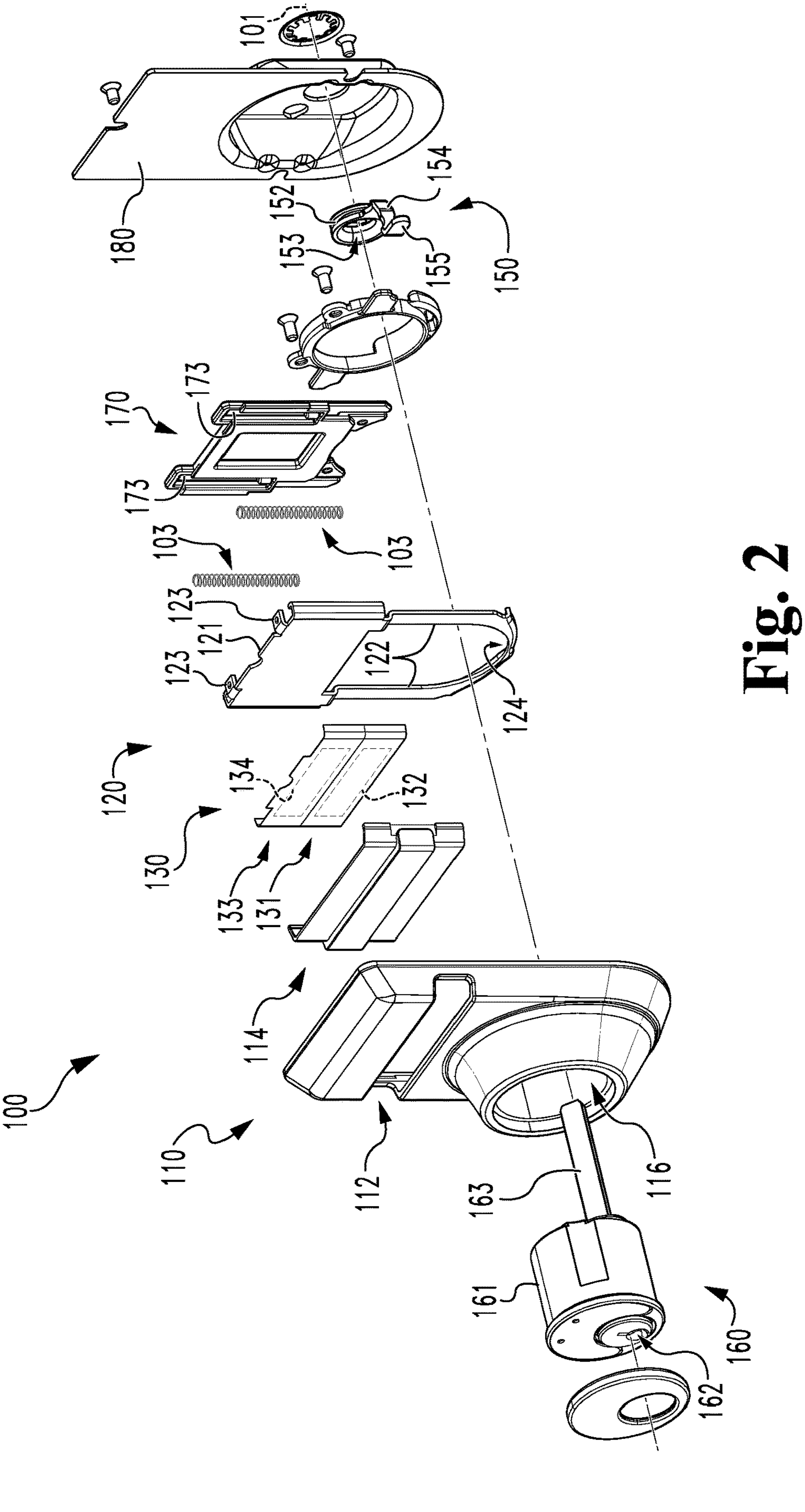
FIG. 2 is an exploded assembly view of an outside trim according to certain embodiments.

With reference to FIG. 2, the outside trim 100 generally includes an escutcheon 110, an indicator mechanism 120 slidably mounted in the escutcheon 110 and including an indicating portion 130, a cam 150 operable to engage the indicator mechanism 120, an actuator 160 operable to rotate the cam 150, an anchor base 170 having a pair of springs 103 seated therein, and a back plate 180 that encloses the working components of the outside trim 100 within the escutcheon 110. As described herein, rotation of the cam 150 between a first rotational position and a second rotational position drives the indicator mechanism 120 between a first linear position and a second linear position to thereby selectively and alternately display each of a first indicium 132 and a second indicium 134.

The illustrated escutcheon 110 includes a window 112 through which the indicia 132, 134 are selectively displayed, and an actuator seat 116 in which the actuator 160 is seated. In certain embodiments, a shield 114 may be mounted to the escutcheon 110 at the window 112 to thereby discourage tampering with the indicator mechanism 140. As will be appreciated, the shield 114 may be transparent or translucent such that the indicia 132, 134 are visible when aligned with the window 112.

The indicator mechanism 120 includes an indicating portion 130, which generally includes a first display area 131 having a first indicium 132, and a second display area 133 having a second indicium 134. As noted above, the first indicium 132 pertains to the first state of the lockset 80 (e.g., one of a locked state or an unlocked state), and the second indicium 134 pertains to the second state of the lockset (e.g., the other of a locked state or an unlocked state). In various forms, one or both of the indicia 132, 134 may take the form of a color, a symbol, a word, one or more alphanumeric characters, or another form of indicium. In the illustrated form, the indicator mechanism 120 comprises a plate portion 121, and the indicating portion 130 is provided in the form of a label 139 that is mounted to the plate portion 121. For example, the label 139 may be provided in the form of a sticker or decal that includes the indicia 132, 134. It is also contemplated that the indicator mechanism 120 may be provided with the indicia 132, 134 in another manner. For example, the indicia 132, 134 may instead be printed, painted, or formed on the plate portion 121, or provided to the indicator mechanism 120 in another manner.

The indicator mechanism 120 is slidably mounted in the escutcheon 120 for movement between a first linear position and a second linear position. When the indicator mechanism 120 is in the first linear position, the first display area 131 is aligned with the window 112 such that the first indicium 132 is visible, thereby indicating to users that the lockset 80 is in the first state. When the indicator mechanism 120 is in the second linear position, the second display area 133 is aligned with the window 112 such that the second indicium 134 is visible, thereby indicating to users that the lockset 80 is in the second state. As described herein, the indicator mechanism 120 is configured to move between the first linear position and the second linear position in response to rotation of the cam 150 between a first rotational position and a second rotational position.

In addition to the indicating region 130, the illustrated indicator mechanism 120 generally includes a plate portion 121, a pair of laterally-spaced arms 122 extending from the plate portion 121, and a cam surface 124 extending between and connecting the lower ends of the arms 122. The illustrated indicator mechanism 120 further includes a pair of tabs 123, and the tabs 123 are engaged with the springs 103 such that the indicator mechanism is biased in a first direction (upward in FIG. 2) toward its first linear position, in which the first indicium 132 is aligned with the window 112.

The cam 150 is mounted for rotation within the escutcheon 110, and is operable to be rotated by the actuator 160. In the illustrated form, the cam 150 includes a body portion 152 defining a slot 153 through which a tailpiece 163 of the actuator 160 extends such that the cam 150 is rotationally coupled with the tailpiece 163. The cam 150 also includes an arm 154 that extends from the body portion 152 at least partially in the longitudinal direction, and which includes a finger 155 that rides along the arcuate cam surface 124 during actuation of the trim 100 as described herein.

The illustrated actuator 160 is mounted in the actuator seat 116, and generally includes a shell 161, a plug 162 rotatably mounted in the shell 161, and a tailpiece 163 operable to be rotated by the plug 162. In the illustrated form, the actuator 160 is provided in the form of a lock cylinder that further includes a tumbler assembly operable to selectively prevent rotation of the plug 162. As will be appreciated, when an appropriate key is inserted to the plug of a lock cylinder, the key moves the tumbler assembly to an unblocking state to thereby permit rotation of the plug. It is also contemplated that the actuator 160 may be provided in the form of an emergency override 160' (FIG. 8), in which the plug 162' is freely rotatable relative to the shell 161'. For example, the plug 162' of the emergency override 160' may include a slot 169' 164' configured to receive an edge of a coin or other tool to thereby facilitate rotation of the plug 162' relative to the shell 161'.

As will be appreciated, the actuator 160 is operable to transition the lockset 80 between its first state and its second state. In the illustrated form, the tailpiece 163 engages the retractor 96 of the deadbolt mechanism 90 such that rotation of the plug 162 causes a corresponding movement of the bolt 94, thereby locking and unlocking the lockset 80. It is also contemplated that the actuator 160 may instead move another component to transition the lockset 80 between its first state and its second state.

The anchor base 170 is mounted in the escutcheon 110 adjacent the indicator mechanism 120, and generally includes a pair of channels 173 in which the springs 103 are seated. Each of the indicator mechanism tabs 123 extends into a corresponding one of the channels 173 to thereby engage the corresponding spring 103 while limiting the indicator mechanism 120 to movement in the transverse direction (e.g., up and down).

The back plate 180 is configured for mounting to the door 70 and for enclosing the internal components within the escutcheon 110. In the illustrated form, the back plate 180 includes a protruding portion 182 that projects into the cross-bore 75 of the door 70. This arrangement may, for example, provide additional space for the internal components of the trim 100 to thereby reduce the visible size of the trim 100.

Figure 3:
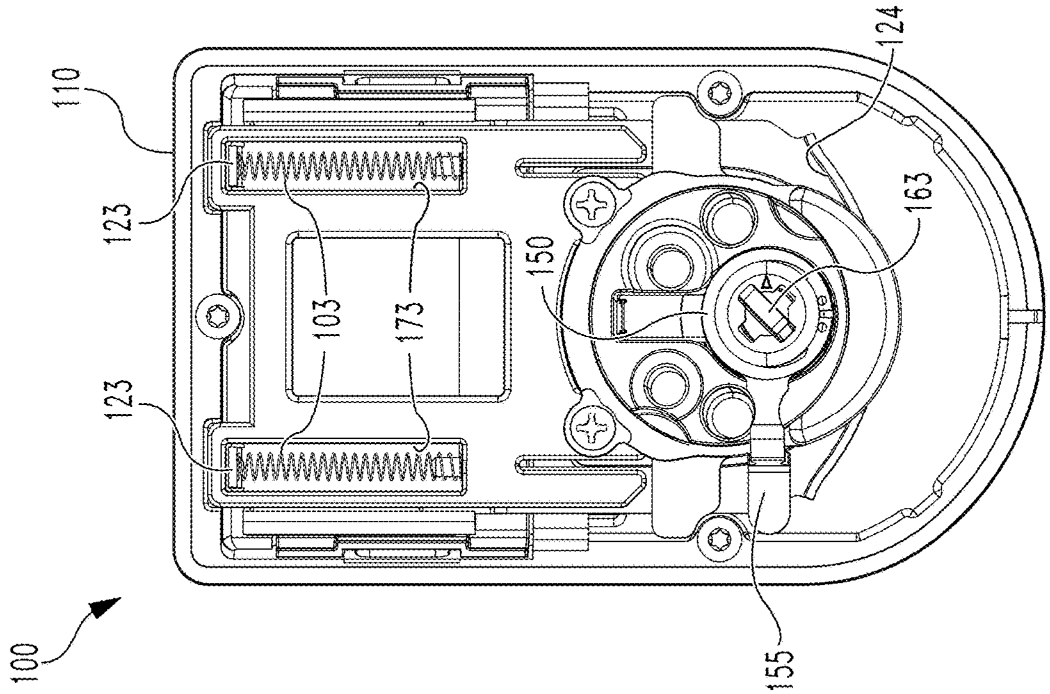
FIG. 3 is a rear view of the outside trim in a first state.
Figure 4:
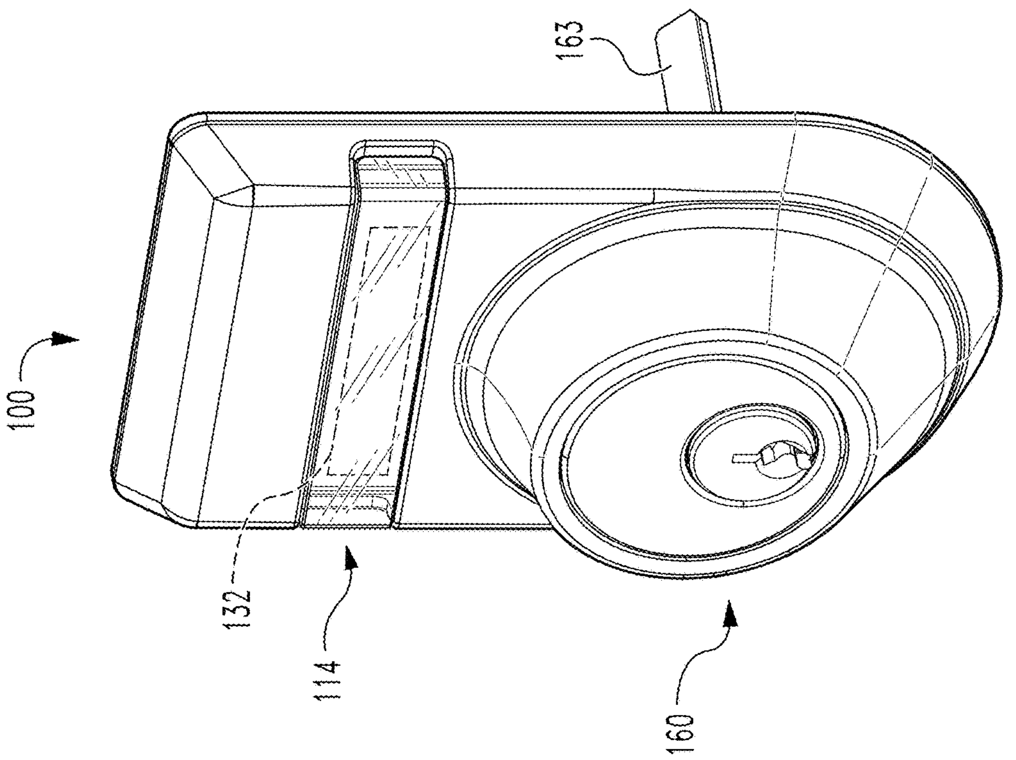
FIG. 4 is a perspective view of the outside trim in the first state.
Figure 6:
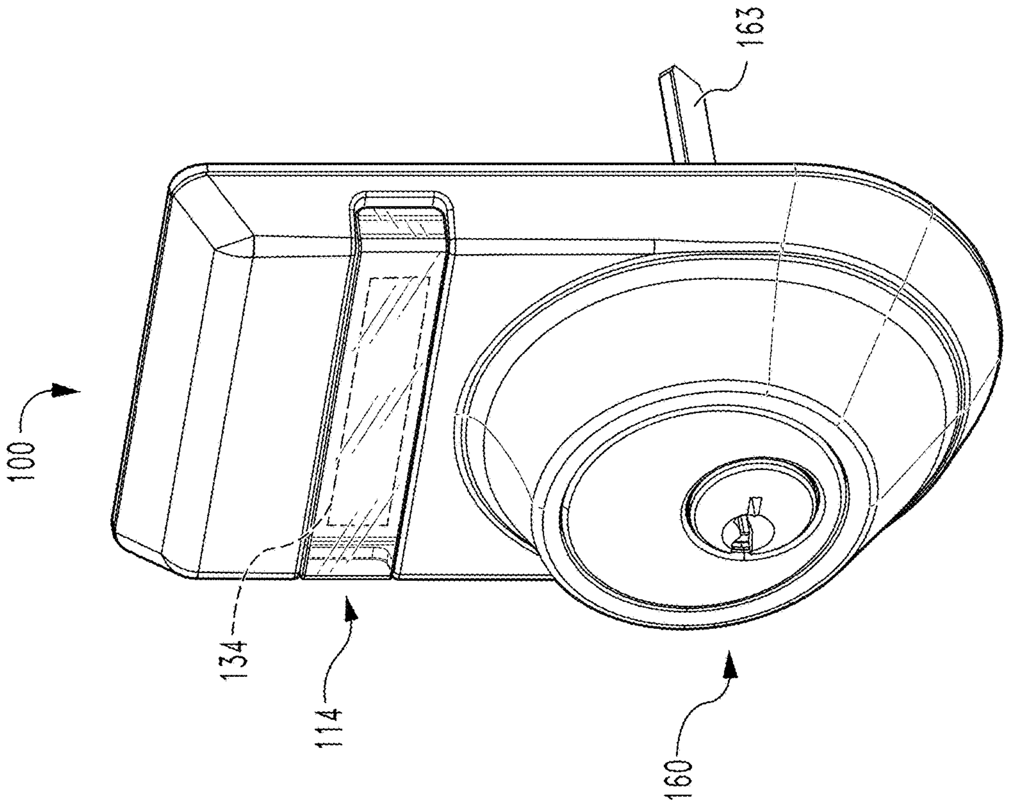
FIG. 6 is a perspective view of the outside trim in the second state.
Figure 5:
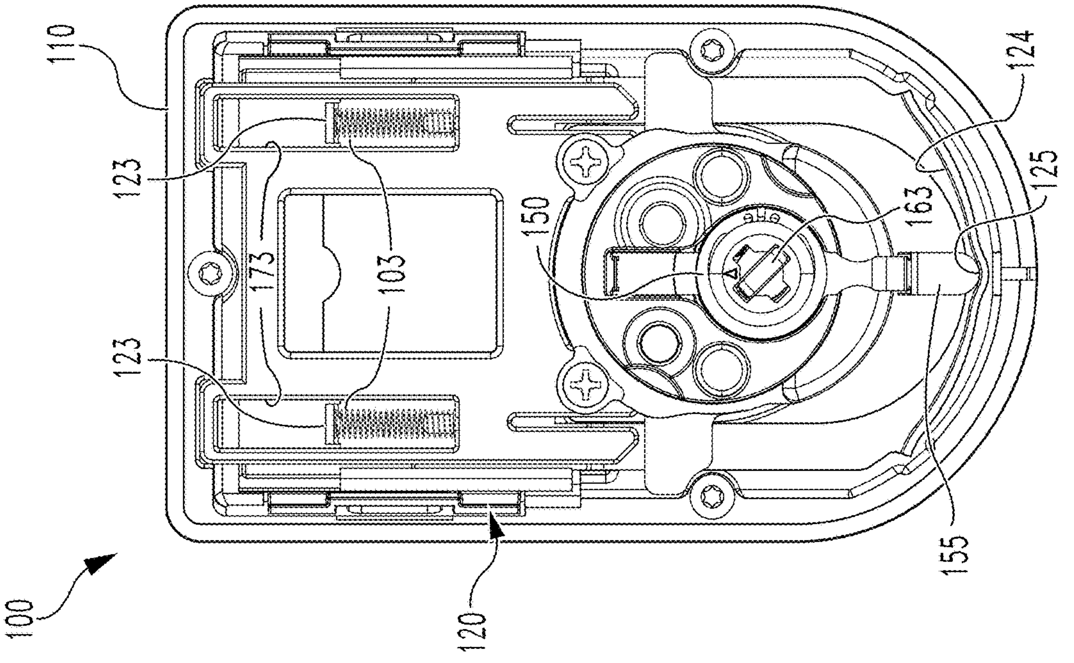
FIG. 5 is a rear view of the outside trim in a second state.

With additional reference to FIGS. 3-6, illustrated therein is the trim 100 in its first state (FIGS. 3 and 4) and its second state (FIGS. 5 and 6). In the illustrated form, the first state (FIGS. 3 and 4) corresponds to the locked state of the lockset 100, and the second state (FIGS. 5 and 6) corresponds to the unlocked state of the lockset 100. It is also contemplated that this arrangement may be reversed such that the first state corresponds to the unlocked state and the second state corresponds to the locked state.

FIGS. 3 and 4 illustrate the trim 100 in its first state, in which the indicator mechanism 120 is in its first linear position and the cam 150 is in its first rotational position. In this state, the arm 154 of the cam 150 is off to one side, and thereby permits the indicator mechanism 120 to adopt its first linear position under the biasing force of the springs 103. With the indicator mechanism 120 in its first linear position, the first indicium 132 is visible via the window 114.

FIGS. 5 and 6 illustrate the trim 100 in its second state, in which the indicator mechanism 120 is in its second linear position and the cam 150 is in its second rotational position. In this state, the arm 154 points downward, and the finger 155 is engaged with the cam surface 124 to thereby retain the indicator mechanism 120 in its second linear position against the biasing force of the springs 103. The illustrated cam surface 124 includes a detent recess 125 that engages with the finger 155 when the cam 150 is in its second rotational position. With the indicator mechanism 120 in its second linear position, the second indicium 134 is visible via the window 114.

Figure 7:
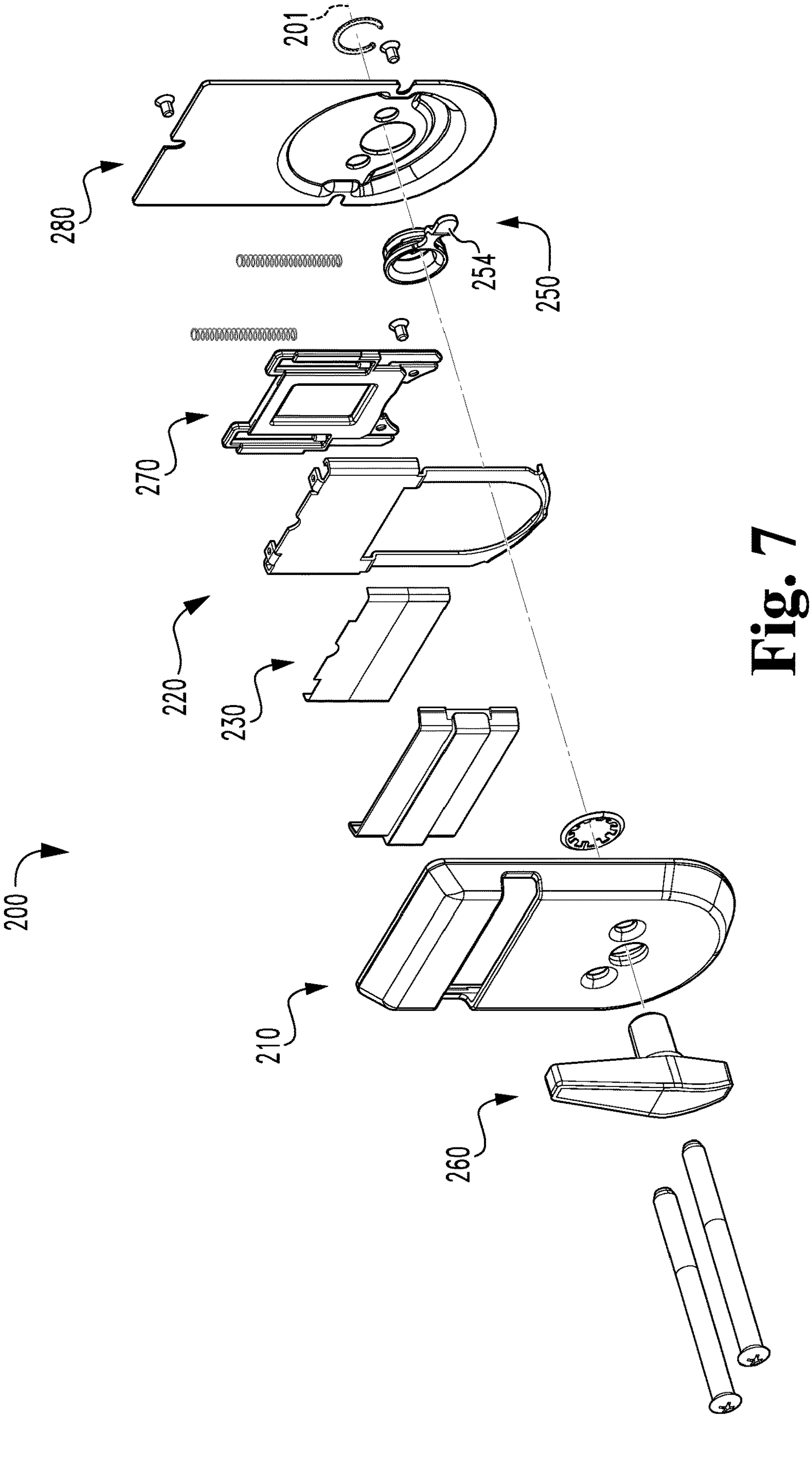
FIG. 7 is an exploded assembly view of an inside trim according to certain embodiments.

With additional reference to FIG. 7, the inside trim 200 is substantially similar to the outside trim 100, and similar reference characters are used to indicate similar elements and features. For example, the inside trim 200 generally includes an escutcheon 210, an indicator mechanism 220, an indicating region 230, a cam 250, an actuator 260, an anchor base 270, and a back plate 280, which respectively correspond to the escutcheon 110, indicator mechanism 120, indicating region 130, cam 150, actuator 160, anchor base 170, and back plate 180 described above with reference to the outside trim 100. In the interest of conciseness, the following description of the inside trim 200 focuses primarily on features that are different from those described above with reference to the outside trim 100.

In contrast to the outside trim 100, in which the actuator is provided in the form of a lock cylinder 160 or an override mechanism 160', the actuator of the inside trim 200 is provided in a form that facilitates manual manipulation of the locked/unlocked state of the trim 200. For example, the actuator of the illustrated inside trim 200 may be provided in the form of a thumb turn 260, which may be rotationally coupled with the tailpiece 163 of the outside trim 100 to thereby permit manual adjustment of the locked/unlocked state of the lockset 80 via the thumb turn 260.

In the inside trim 200, the cam 250 may be slightly different from the cam 150 of the outside trim 100. For example, the arm 254 of the illustrated cam 250 extends radially, but does not necessarily extend in the longitudinal direction defined by the rotational axis 201. Regardless of the precise configuration of the cams 150, 250, the inside cam 250 may interact with the indicator mechanism 220 in a manner substantially similar to that described above in order to transition the inside trim 200 between its first state and its second state.

Figure 8:
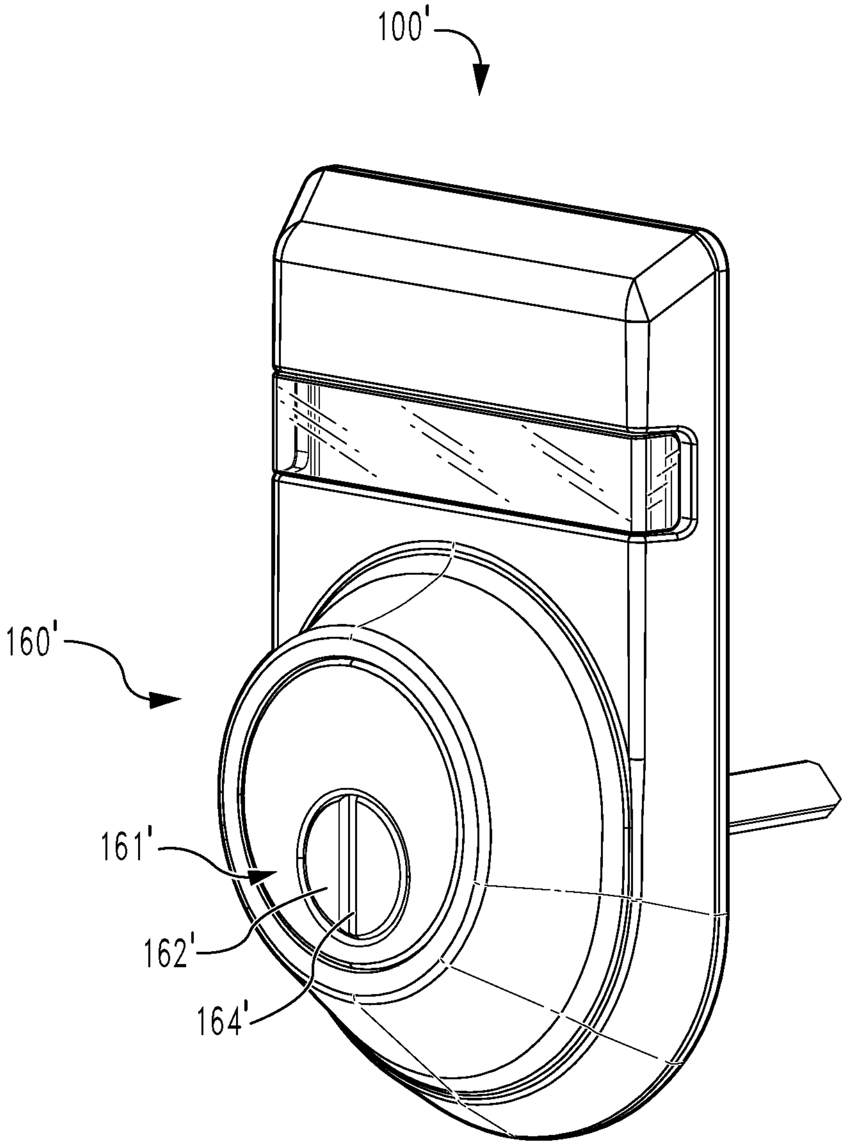
FIG. 8 is a perspective view of an outside trim according to certain embodiments.
Figure 9:
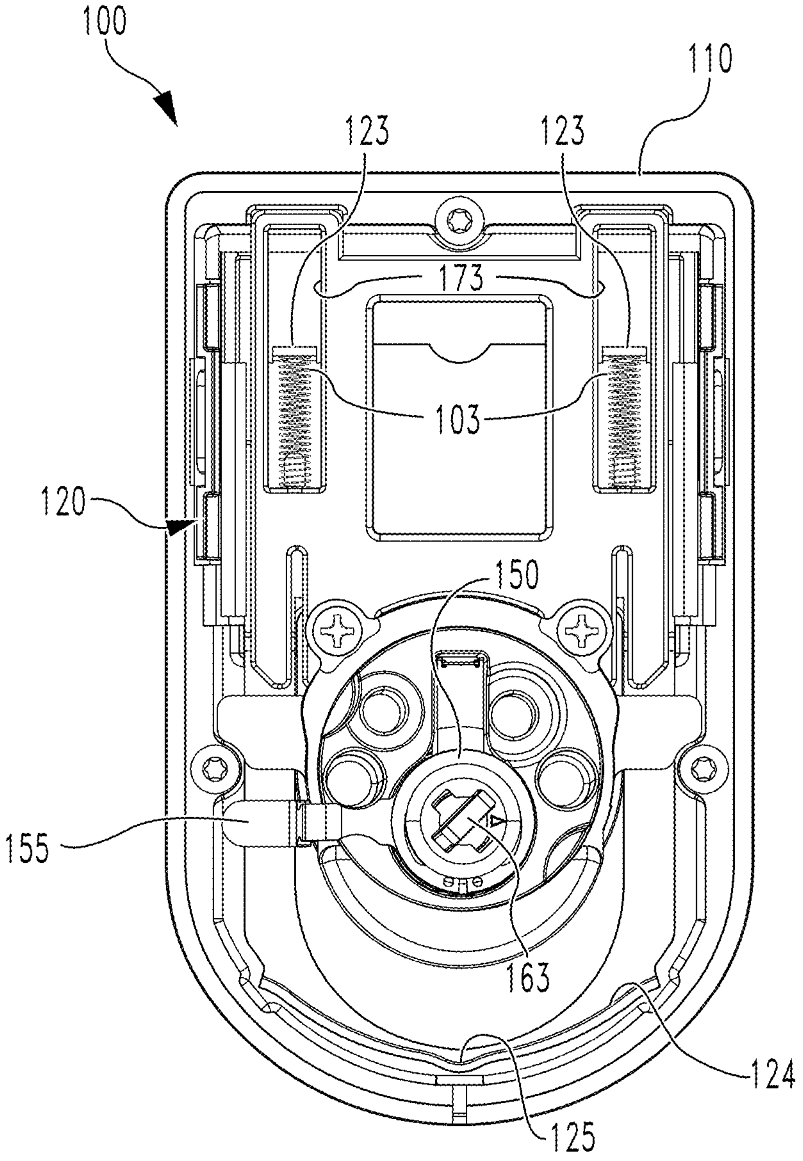
FIG. 9 is a rear view of the outside trim following application of a tampering force that has moved an indicator mechanism from a first linear position to a second linear position.

With additional reference to FIG. 8, illustrated therein is an outside trim 100' according to certain embodiments. The outside trim 100' is substantially similar to the above-described outside trim 100, but includes an override mechanism 160' in place of the lock cylinder 160. The override mechanism 160' generally includes a shell 161', a plug 162' mounted for rotation within the shell 161', and a tailpiece extending from the plug 162' into engagement with the bolt mechanism 90. The plug 162' includes a slot 164' operable to receive an edge of a coin or other tool to facilitate tool-assisted override of the locked state.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

What is claimed is:

1. A lockset trim, comprising:

an escutcheon comprising a window;

an indicator mechanism mounted in the escutcheon for sliding movement between a first linear position, in which a first indicium is visible via the window, and a second linear position, in which a second indicium is visible via the window, wherein the indicator mechanism comprises a plate portion including an arcuate cam surface, and wherein the indicator mechanism is biased toward the first linear position; and a cam rotatably mounted in the escutcheon for rotation about a longitudinal axis between a first rotational position, in which the cam permits the indicator mechanism to adopt the first linear position, and a second rotational position, in which the cam retains the indicator mechanism in the second linear position, wherein the cam comprises:

a body portion surrounding the longitudinal axis;

a finger that rides along the arcuate cam surface as the cam rotates between the first rotational position and the second rotational position;

an arm extending from the body portion toward the finger; and one or more bends that cause a portion of the arm to extend in an axial direction defined by the longitudinal axis, wherein the portion of the arm that extends in the axial direction is positioned between the body portion and the finger.

2. The lockset trim of claim 1, wherein the cam is operable to remain in the first rotational position during movement of the indicator mechanism by an externally-applied tampering force from the first linear position to the second linear position.

3. The lockset trim of claim 1, further comprising a spring constantly biasing the indicator mechanism toward the first linear position.

4. The lockset trim of claim 1, further comprising an actuator including a tailpiece engaged with the cam such that the actuator is operable to rotate the cam between the first rotational position and the second rotational position.

5. The lockset trim of claim 1, further comprising a back plate mounted to the escutcheon such that the indicator mechanism is captured between the escutcheon and the back plate;

wherein the back plate comprises a protruding portion configured to be received in a cross-bore of a door;

wherein the body portion of the cam is received in the protruding portion; and wherein the portion of the arm that extends in the axial direction extends out of the protruding portion such that the finger is positioned outside the protruding portion.

6. The lockset trim of claim 1, wherein the plate portion comprises an indicating portion including the first indicium and the second indicium, and wherein the indicating portion and the cam surface are coupled for joint movement between the first linear position and the second linear position.

7. A lockset trim, comprising:

an escutcheon comprising a window;

an anchor base mounted within the escutcheon, the anchor base comprising a channel;

a spring seated in the channel;

an indicator mechanism mounted in the escutcheon for sliding movement between a first linear position, in which a first indicium is visible via the window, and a second linear position, in which a second indicium is visible via the window, wherein the indicator mechanism comprises a plate portion including a tab that projects into the channel and engages the spring such that the spring biases the indicator mechanism toward the first linear position; and a cam rotatably mounted in the escutcheon for rotation about a longitudinal axis between a first rotational position, in which the cam permits the indicator mechanism to adopt the first linear position, and a second rotational position, in which the cam retains the indicator mechanism in the second linear position.

8. A lockset trim, comprising:

an escutcheon comprising a window;

an indicator plate mounted in the escutcheon for sliding movement between a first linear position and a second linear position, wherein the indicator plate comprises:

an indicating portion comprising a first indicium that is aligned with the window when the indicator plate is in the first position, and a second indicium that is aligned with the window when the indicator plate is in the second position; and a cam surface having a fixed location relative to the indicating portion such that the indicating portion and the cam surface move jointly as a unit;

a spring biasing the indicator plate toward the first linear position; and a cam rotatably mounted in the escutcheon for rotation about a longitudinal axis between a first rotational position in which the cam permits the indicator mechanism to adopt the first linear position as a result of the biasing of the spring, and a second rotational position in which the cam retains the indicator mechanism in the second linear position against the biasing of the spring;

wherein the cam comprises an arm;

wherein with the cam in the second rotational position, a finger of the arm is engaged with the cam surface such that the arm exerts on the indicator plate a force opposite the biasing of the spring; and wherein the cam surface comprises a detent recess that is engaged with the finger when the cam is in the second rotational position.

9. The lockset trim of claim 8, wherein the indicator plate is biased toward the first position at all times by the spring.

10. The lockset trim of claim 8, wherein the spring at all times biases the indicator plate in a first linear direction; and wherein, with the cam in the second rotational position, a line extending from the rotational axis to the finger points in a second linear direction opposite the first linear direction.

11. The lockset trim of claim 8, wherein the cam surface is arcuate.

* * * * *